United States Patent

Bergum et al.

[15] 3,706,616
[45] Dec. 19, 1972

[54] DUPLEX ELECTRODE CONSTRUCTION USING CONTINUOUS METAL CARRIER STRIP HAVING AT LEAST ONE NONREACTIVE METAL SIDE

[72] Inventors: Bernard C. Bergum, Monona; John A. Youngquist, Madison, both of Wis.

[73] Assignee: ESB Incorporated

[22] Filed: Dec. 21, 1970

[21] Appl. No.: 100,237

[52] U.S. Cl. ................... 136/175, 136/10, 136/111
[51] Int. Cl. .......................................... H01m 31/00
[58] Field of Search .................. 136/10–12, 111, 136/175, 83, 6, 108, 133–135

[56] References Cited

UNITED STATES PATENTS

| | | | |
|---|---|---|---|
| 3,563,805 | 2/1971 | Deierhoi, Jr. | 136/111 |
| 3,081,369 | 3/1963 | Coleman et al. | 136/87 |
| 2,844,641 | 7/1958 | Lang et al. | 136/111 |
| 2,971,999 | 2/1961 | Jacquier | 136/6 |
| 3,116,173 | 12/1963 | Raper | 136/175 |
| 2,519,054 | 8/1950 | Woodring | 136/111 |
| 2,745,894 | 5/1956 | Nowotny | 136/111 |
| 2,870,235 | 1/1959 | Soltis | 136/111 |
| 3,004,093 | 10/1961 | Richter et al. | 136/175 |
| 3,004,094 | 10/1961 | Haessley | 136/175 |
| 3,306,777 | 2/1967 | Reid et al. | 136/111 |

*Primary Examiner*—Anthony Skapars
*Attorney*—Robert H. Robinson, Raymond L. Balfour; Anthony J. Rossi and Thomas A. Lennox

[57] ABSTRACT

Duplex electrodes are constructed by placing intermittent deposits of positive and negative electrodes on opposite sides of a continuous metal carrier strip having two nonreactive metal sides. In another embodiment, duplex electrodes are constructed by placing intermittent deposits of positive electrodes on the only nonreactive side of the bimetal carrier strip, with the reactive side of the bimetal strip functioning as the negative electrode in the duplex electrode. The duplex electrodes are assembled into multicell batteries. The assembly preferably occurs while the duplex electrodes are structurally and electrically connected by the continuous metal carrier strip; the carrier strip is then subsequently cut between duplex electrodes to obtain structurally and electrically unconnected batteries. Alternatively, the carrier strip may be cut between duplex electrodes before those electrodes are assembled into multicell batteries.

The metal carrier strip may comprise: (1) a unimetal which is nonreactive to the positive and negative electrodes and to the electrolyte within the battery; (2) a bimetal in which the metal adjacent the positive electrode is nonreactive with respect to that electrode and the metal adjacent the negative electrode is nonreactive with respect to that electrode; (3) a trimetal whose outer two layers are nonreactive as in (2); and, (4) a bimetal or trimetal in which the metal adjacent the positive electrode is nonreactive with respect to that electrode and in which the other metal functions as the negative electrode in the battery. The particular metals employed will depend upon the electrochemical system used in the battery.

10 Claims, 7 Drawing Figures

PATENTED DEC 19 1972

PATENTED DEC 19 1972 3,706,616
SHEET 3 OF 3

DUPLEX ELECTRODE CONSTRUCTION USING CONTINUOUS METAL CARRIER STRIP HAVING AT LEAST ONE NONREACTIVE METAL SIDE

BACKGROUND OF THE INVENTION

1. Field of the Invention

This invention concerns duplex electrodes (also known as bipolar electrodes). In several embodiments, deposits of positive and negative electrodes are intermittently placed on opposite sides of a continuous metal carrier strip having two nonreactive metal sides, while in another embodiment, only positive electrodes are applied to the strip on the only nonreactive metal side of the strip. Both the methods of constructing duplex electrodes and multicell batteries and the resultant products are claimed.

2. Description of the Prior Art

In the construction of a multicell battery, three essential requirements must be met: a member which is impervious to the electrolyte of the battery must be used between adjacent cells to seal one cell from the next; some means must be provided by which electrical current may be conducted between the positive electrode in one cell and the negative electrode in an adjacent cell; and the electrolyte impervious member and the electrical conductor means must not create any undesired reactions in the battery. Other desirable attributes are that there be low electrical resistances between the positive electrode of one cell and the negative electrode of an adjacent cell and that the battery be constructed using inexpensive materials and methods.

One technique for constructing multicell batteries is with the use of duplex electrodes, also known as bipolar electrodes. A duplex electrode is a separately constructed assembly in which an electrolyte impervious, electrochemically nonreactive member which eventually divides one cell from an adjacent cell is surrounded on one side with a positive electrode and on the other side with a negative electrode. After being so constructed, the duplex electrode is subsequently assembled into a multicell battery.

SUMMARY OF THE INVENTION

With several embodiments of this invention, duplex electrodes are constructed by placing positive and negative electrodes in contact with opposite sides of a continuous metal carrier strip having nonreactive metal sides. In another embodiment, duplex electrodes are constructed by placing intermittent deposits of positive electrodes on only the nonreactive side of the bimetal carrier strip, with the reactive side of the bimetal strip functioning as the negative electrode in the duplex electrode. Use of the carrier strip as a substrate permits the positive and negative electrodes to be made from compositions which, during the construction of the duplex electrode, are unable or poorly suited to function as a substrate. Use of an electrically conductive carrier strip permits electrical current to be conducted between the electrodes without additional components or assembly steps.

The metal carrier strip may comprise: (1) a unimetal which is nonreactive to the positive and negative electrodes and to the electrolyte within the battery; (2) a bimetal in which the metal adjacent the positive electrode is nonreactive with respect to that electrode and the metal adjacent the negative electrode is nonreactive with respect to that electrode; (3) a trimetal whose outer two layers are nonreactive as in (2); and, (4) a bimetal or trimetal in which the metal adjacent the positive electrode is nonreactive with respect to that electrode and in which the other metal functions as the negative electrode in the battery. The particular metals employed will depend upon the electrochemical system used in the battery.

In the first three of the enumerated embodiments, the positive and negative electrodes are applied in intermittent deposits along the carrier strip with a deposit of positive electrodes being placed opposite a deposit of negative electrode. During this construction process, the resulting duplex electrodes are structurally and electrically connected together. The structural connection is desirable because high speed production machinery is better able to receive continuous strips of stock than individual pieces. The duplex electrodes are then assembled into multicell batteries. The assembly preferably occurs while the duplex electrodes are structurally and electrically connected by the continuous metal carrier strip; the carrier strip is then subsequently cut between duplex electrodes to obtain structurally and electrically unconnected batteries. Alternatively, the carrier strip may be cut between duplex electrodes before those electrodes are assembled into multicell batteries.

BRIEF DESCRIPTION OF THE DRAWINGS

FIG. 4 shows intermittent deposits of positive and negative electrodes on the opposite sides of the metal strip.

DESCRIPTION OF THE PREFERRED EMBODIMENTS

Figure 1:
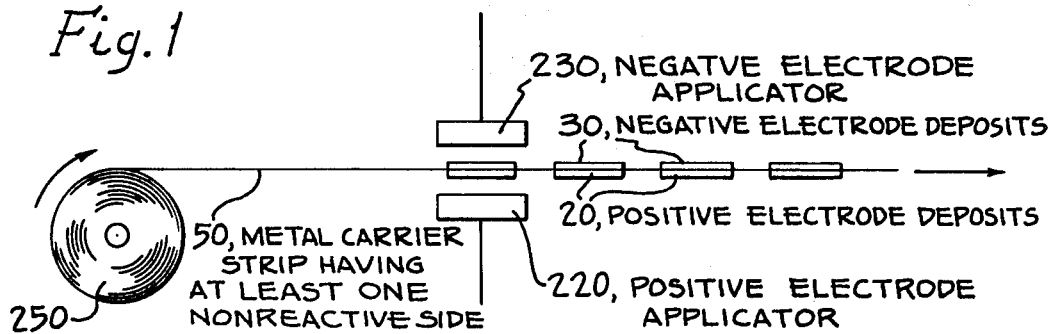
FIG. 1 is a schematic diagram showing a continuous unimetal carrier strip having nonreactive metal being passed by applicators which place intermittent deposits of positive and negative electrodes in contact with the carrier strip.
Figures 4, 7:
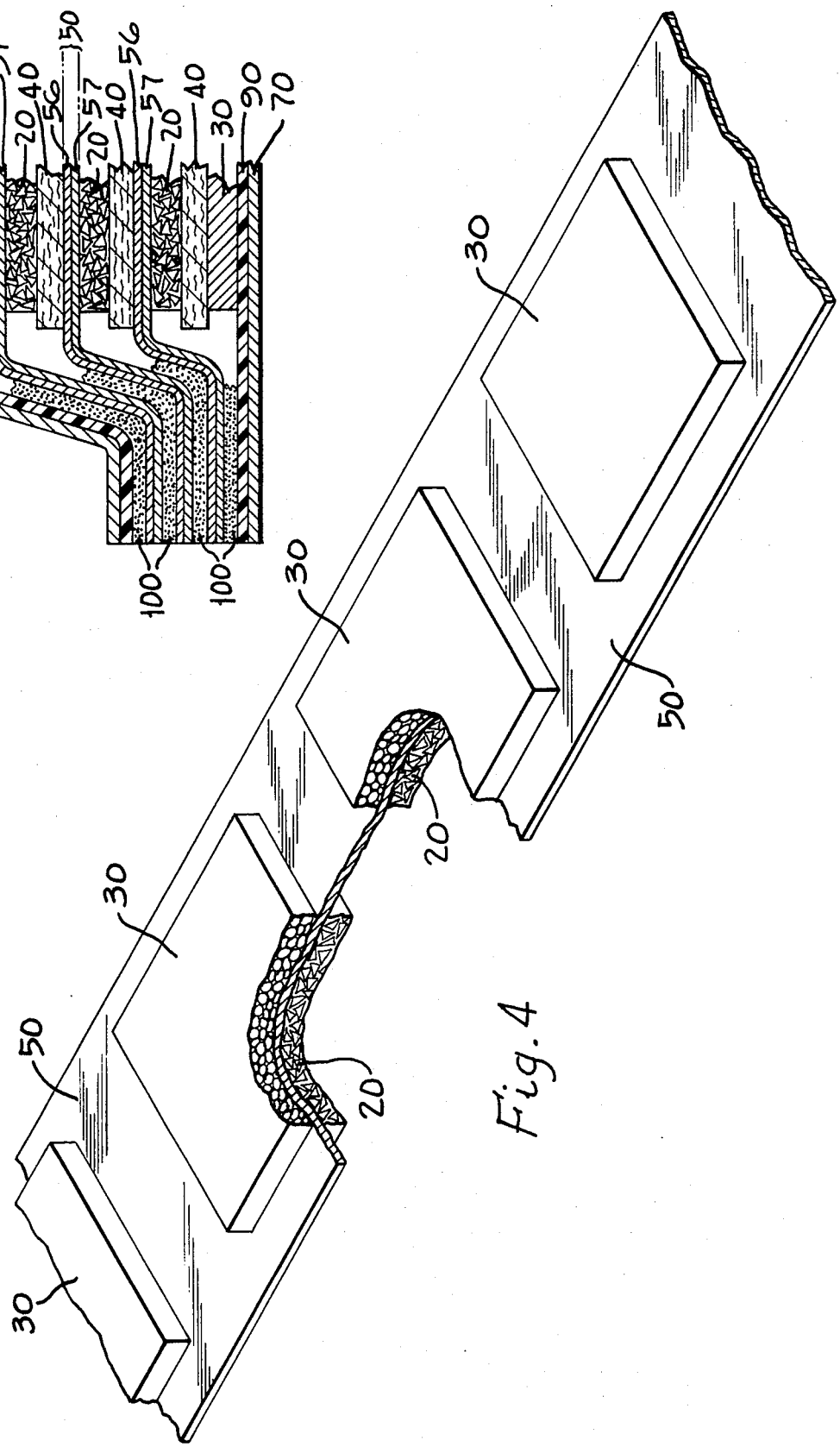
FIG. 4 is an oblique view of a portion of the product resulting from the process of FIG. 1.
FIG. 7 is similar to FIG. 3 except that the metal strip employed in the construction of the duplex electrodes is a bimetal in which the metal adjacent the positive electrode is nonreactive with respect to that electrode and in which the other metal functions as the negative electrode in the battery.

FIG. 1 is a schematic diagram showing a continuous carrier strip of substantially homogeneous metal ("unimetal") 50 coming from a roll or some other source of supply 250 and being passed by positive and negative electrode applicators 220 and 230, respectively, where the applicators place intermittent deposits of positive and negative electrodes 20 and 30, respectively, on opposite sides of the carrier strip from each other. Each deposit of negative electrode is substantially opposite a deposit of positive electrode. The applicators 220 and 230 may be spaced opposite one another so that they make their opposing deposits simultaneously, or they may be spaced apart so that one applicator first makes its deposit and later the other applicator makes the opposing deposit. FIG. 4 shows intermittent deposits of positive and negative electrodes on the opposite sides of the metal strip. It will be understood by those skilled in the art that a segment of the carrier strip having positive and negative electrodes on its opposite sides defines a duplex electrode, also known as a bipolar electrode.

The metal 50 of the carrier strip shown in FIG. 1 will be selected to be nonreactive in the electrochemical environment in which it is used, that is, so that it is nonreactive with the particular electrode materials and electrolyte used in the battery. Metals which are nonreactive in nearly all electrochemical environments in common usage include titanium, tantalum, and gold; these metals and others which are nonreactive in some but not all electrochemical environments may be used.

As can be seen from FIG. 1, the duplex electrodes are structurally and electrically connected together immediately after the carrier strip passes by the second of the two applicators; these physical and electrical connections between duplex electrodes subsequently must be broken, but this can be done either before or after the duplex electrodes are assembled into multicell batteries.

Figure 2:
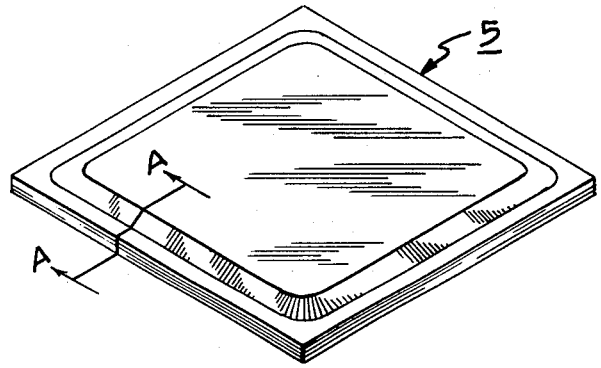
FIG. 2 is an oblique view of a multicell battery containing duplex electrodes made according to this invention.
Figure 3:
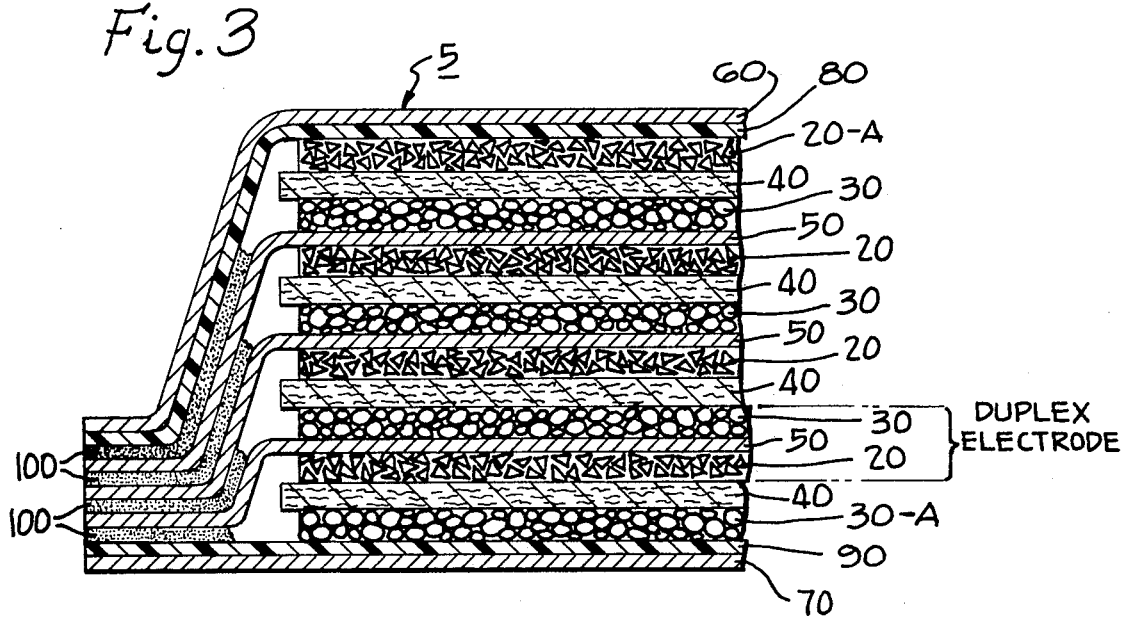
FIG. 3 illustrates a cross-section of the battery shown in FIG. 2 taken along the line A—A of FIG. 2. The thickness of the battery is shown greatly magnified for purposes of illustration.

The eventual multicell battery product is the same whether the duplex electrodes constructed as shown in FIG. 1 are assembled into multicell batteries before or after being structurally and electrically unconnected from each other. FIG. 2 shows such a multicell battery 5 in an oblique view. FIG. 3 shows a portion of the multicell battery 5 in magnified cross-section and illustrates members of the battery, each of which will be described in greater detail in subsequent paragraphs. As FIG. 3 shows, the battery 5 comprises the combination of an outer positive electrode 20–A, an outer negative electrode 30–A, and at least one duplex electrode between electrodes 20–A and 30–A, each duplex electrode being of the type constructed by the method shown in FIG. 1. The duplex electrode shown in FIG. 3 comprises the combination of a segment of the unimetal carrier strip 50 shown in FIG. 1 which functions as the intercell connector of the duplex electrode, together with deposits of positive and negative electrodes 20 and 30 respectively on the opposite sides of the segment. The multicell battery 5 also includes an electrolyte impregnated separator 40 between each positive electrode 20 or 20–A and each negative electrode 30 or 30–A. Liquid impervious layers 80 and 90 which also function as current conducting means are in contact with the outer electrodes 20–A and 30–A respectively. Metal current collectors 60 and 70 which also function as vapor barriers are on the outside of layers 80 and 90. Electrolyte impervious sealing means and electrical insulating means around the electrolyte impregnated separators 40 are designated by the numeral 100.

Numerous advantages result from the construction illustrated schematically in FIG. 1 and described above. Use of the carrier strip as a substrate permits the electrodes to be made from compositions which, during the construction of the duplex electrodes, are unable or poorly suited to function as a carrier strip. Examples of electrodes which are unable or poorly suited to function as a carrier strip include electrodes comprising particles of active material contained in and dispersed throughout a porous matrix; flame spray deposits; and vapor deposits.

The conductive carrier strip also permits current to be conducted between the positive and negative electrodes in a duplex electrode without the use of any other electrically conductive members.

The use of the continuous carrier strip as a substrate along which intermittent deposits of electrodes are applied is also advantageous from the viewpoint of manufacturing techniques. Modern, high speed production machinery is better able to apply such deposits along a continuous strip than to apply deposits to a succession of individual pieces. Maximum advantage of this principle may be attained in conjunction with this invention by using the continuous strip as a processing implement throughout the construction of the multicell batteries, leaving the step of cutting the carrier strip into segments until all other assembly steps required to construct the multicell batteries have been taken. In this regard, it is preferred to construct a plurality of structurally and electrically unconnected multicell batteries by beginning with the construction of duplex electrodes which are structurally and electrically connected together along the continuous metal strip having nonreactive metal sides. This consists of placing intermittent deposits of positive and negative electrodes along the carrier strip as shown in FIG. 1 so that each deposit of negative electrode is on the other side of the strip from and substantially opposite a deposit of positive electrode. The next step in the preferred assembly process consists of constructing multicell batteries which are structurally and electrically connected together by at least one of the carrier strips having positive and negative electrodes deposited thereon, a step which comprises the acts of: placing at least one such carrier strip between outer positive and outer negative electrodes so that each duplex electrode is between an outer positive electrode and an outer negative electrode; placing an electrolyte impregnated separator between each positive and negative electrode; sealing around the perimeter of each electrolyte impregnated separator to produce a liquid impervious seal; sealing a liquid impervious layer around the electrodes and electrolyte impregnated separators; and, connecting to each outer positive electrode electrically conductive means which extend to the exterior of the liquid impervious layer and connecting to each outer negative electrode additional electrically conductive means which extend to the exterior of the liquid impervious layer and connecting to each outer negative electrode additional electrically conductive means which extend to the exterior of the liquid impervious layer. After the multicell batteries have been so constructed, each carrier strip is then cut between duplex electrodes to obtain structurally and electrically unconnected multicell batteries; the carrier strip may be cut between each successive pair of duplex electrodes, or it may be cut into increments each of which contains two or more duplex electrodes so that the resultant batteries structurally and electrically connected by the increment are electrically connected in parallel. During the construction of the multicell batteries, additional components may be processed in the form of continuous strips; alternatively, each of these additional components may also comprise a succession of structurally unconnected components placed along the continuous metal carrier strip.

FIG. 3 is helpful in illustrating these concepts. The multicell battery 5 in FIG. 3 may be made by using three of the unimetal carrier strips 50 with positive and negative electrodes 20 and 30 applied intermittently on the opposite side of each. The electrolyte impregnated separators 40 shown in FIG. 3 were assembled into the battery as structurally unconnected components. The components 60, 70, 80, and 90 were assembled into the multicell battery 5 as continuous strips, although they also could have been components which have no structural connection with each other when assembled into successive multicell batteries. The cutting of the three unimetal carrier strips plus the cutting of any other continuous strips used in constructing the multicell battery 5 may be the last step in the construction of a plurality of multi-cell batteries, thereby retaining the advantages of processing continuous strips rather than individual unconnected pieces for as much of the construction process as possible.

It is not essential that the cutting of the continuous metal carrier strip into structurally and electrically unconnected duplex electrodes be postponed until all other steps in the assembly of multicell batteries are complete. The cutting of the strips may, for instance, be done immediately after the positive and negative electrodes are applied intermittently on opposite sides of the carrier strips and the unconnected duplex electrodes may then be assembled into multicell batteries. If this sequence of steps is taken, then the assembly of a multicell battery after the cutting of the carrier strip comprises: placing at least one of the structurally and electrically unconnected duplex electrodes between an outer positive electrode and an outer negative electrode; placing an electrolyte impregnated separator between each positive and negative electrode; sealing around the perimeter of each electrolyte impregnated separator to produce a liquid impervious seal; sealing a liquid impervious layer around the electrodes and electrolyte impregnated separators; and, connecting to the outer positive electrode electrically conductive means which extend to the exterior of the liquid impervious layer and connecting to the outer negative electrode additional electrically conductive means which extend to the exterior of the liquid impervious layer. The unconnected duplex electrodes could be assembled into multicell batteries as described above in a process in which some other member of the finally constructed batteries was used in the form of a continuous carrier strip during some or all of the assembly steps; for instance, the outside layers could be continuous carrier strips and the duplex electrodes, electrolyte impregnated separators, and outer electrodes could then be placed along those continuous strips, with the cutting of those strips to produce structurally unconnected multicell batteries being postponed until after all other assembly steps have been concluded.

Figure 5:
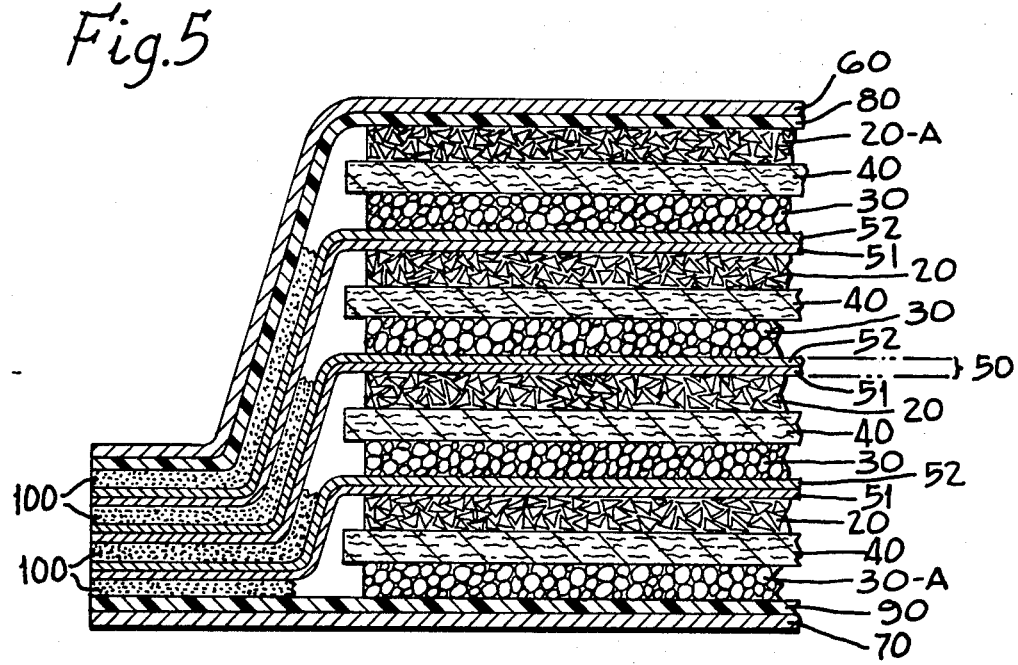
FIG. 5 is similar to FIG. 3 except that the metal strip employed in the construction of the duplex electrodes is a bimetal in which the metal adjacent the positive electrode is nonreactive with respect to that electrode and the metal adjacent the negative electrode is nonreactive with respect to that electrode.

FIG. 5 illustrates an alternative to the construction shown in FIGS. 1, 3 and 4. Rather than using the unimetal carrier strip described above, the construction shown in FIG. 5 employs a bimetal carrier strip 50 in which the metal 51 which is adjacent the positive electrode 20 is nonreactive with respect to that electrode and the metal 52 adjacent the negative electrode 30 is nonreactive with respect to that electrode. The advantage of the construction shown in FIG. 5 is that it permits a wider selection of materials and permits a metals selection based upon the possibility for not reacting with the immediately adjacent electrode. The processing advantages of using the bimetal strip of FIG. 5 are the same as those which result from the use of the unimetal strip shown in FIGS. 1, 3 and 4.

Figure 6:
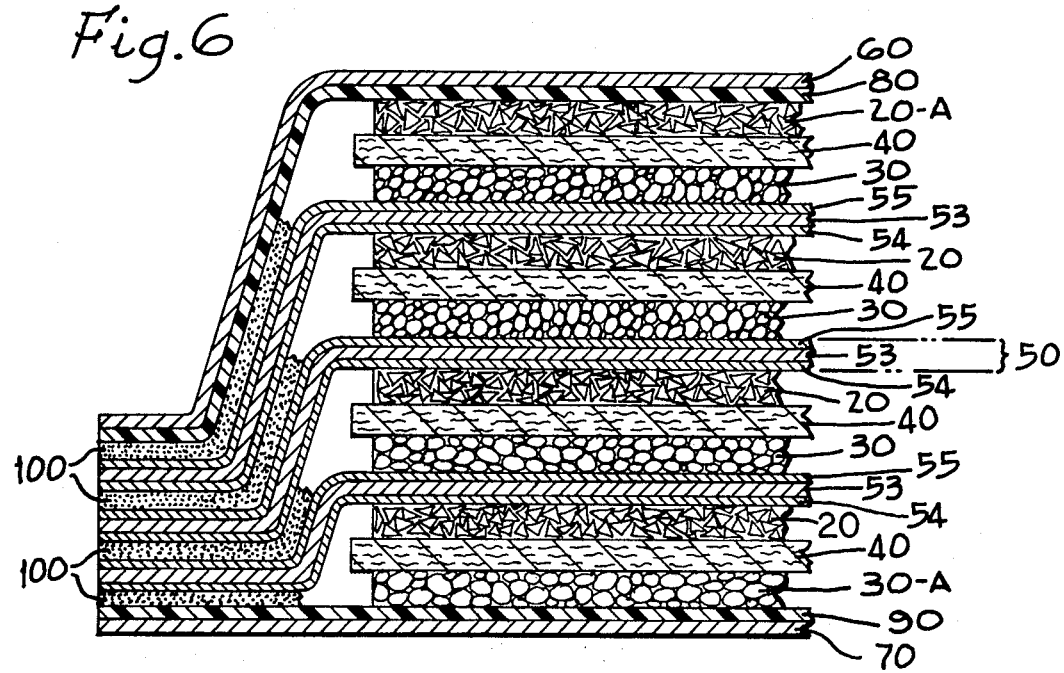
FIG. 6 is similar to FIG. 3 except that the metal strip employed in the construction of the duplex electrodes is a trimetal whose outer two layers are nonreactive with respect to the positive and negative electrodes.

FIG. 6 illustrates still another alternative, this one using a trimetal strip 50 in which an inner thickness of metal 53 is surrounded on its side nearest the positive electrode 20 by a nonreactive metal 54 and is surrounded on its side nearest the negative electrode 30 by a nonreactive metal 55. The two nonreactive metals 54 and 55 offer the same advantages as do the two metals 51 and 52 of FIG. 5. The use of the trimetal construction permits the selection of the metal inside the carrier strip to be based on factors such as cost, electrical conductivity, and ease of fabrication rather than electrochemical inertness if in contact with the electrodes and electrolyte. The two outer metals 54 and 55 may be the same or different metals, e.g., nickel 54—steel 53—nickel 55 or nickel 54—steel 53—tin 55.

FIG. 7 shows another alternative, one using a bimetal carrier strip consisting of metals 56 and 57. Metal 56 is selected from metals which are electrochemically active as negative electrodes in the battery so that metal 56 is analagous in function to the electrode 30 shown in FIGS. 1, 3, 4, 5, and 6. In the design of the battery, the quantity of active metal 56 may be determined by taking into account the quantity of active material in the positive electrodes 20 and 20–A. Metal 57 is selected to be nonreactive with respect to the positive electrode 20. Metal 57 is analagous to the unimetal shown in FIGS. 1, 3 and 4 inasmuch as it is the only layer of nonreactive metal used in the carrier strip, but is also similar to the metal 51 of FIG. 5 inasmuch as it may be selected with primary concern for its possibility for not reacting with the positive electrode 20. Although not shown in the drawings, a trimetal whose outer two metals are the same as those in the bimetal shown in FIG. 7 may be substituted for the bimetal of that figure, with the choice of metal for the inner layer of the trimetal being made from a wide variety of metals.

It is apparent from the discussion above that the unimetal strip of FIGS. 1, 3 and 4, the bimetal strip of FIG. 5, the trimetal strip of FIG. 6, and the bimetal strip of FIG. 7 may all be described as being metal carrier strips having at least one nonreactive metal side. Each may be in the construction of duplex electrodes and in the subsequent assembly of those electrodes into multicell batteries.

In the bimetal and trimetal constructions shown in FIGS. 5 through 7, the nonreactive surfaces may be made by cladding, plating, flame spraying, vacuum deposition, or by any other suitable means.

The composition of each of several of the other members in the battery may take alternative forms, and the compositions of those members will now be discussed.

The positive electrodes 20 and 20-A may each comprise particles of electrochemically positive active material contained in and dispersed through a binder matrix. The positive active material conventionally is divided into tiny particles so as to increase the ration of total surface area to weight in the active material and thereby increase the rate at which the electrochemical reactions can occur by increasing the surface areas where they occur. The binder increases the internal electronic conductivity of the duplex electrode, increases the structural integrity within the positive electrodes, and adheres the positive electrode to the carrier strip. Since electrolyte must have access to the surface of the active material particles, the electrode must be made sufficiently porous so that the electrolyte may diffuse throughout the electrode rapidly and thoroughly. Preferably, the pores in the electrode are produced by the evaporation of liquid during the construction of the electrode; the evaporating liquid may be part of a dispersion binder system in which the solid binder contained in the finally constructed electrode comprises tiny particles of binder material dispersed throughout and not dissolved in the liquid while the electrode is being constructed, or the evaporating liquid may be part of a solution binder system in which the solid binder contained in the finally constructed electrode is dissolved in the liquid which is later evaporated. The porosity of the positive electrodes may be increased as the discharge rate desired in the battery is increased. Electrodes may also be constructed using combinations of the dispersion and solution systems. Alternatively, the pores might be produced by the dissolving of a solid which was present during construction of the electrode or by passing gases through or generating gases within the electrodes at controlled rates during electrode construction. The positive electrodes 20 and 20-A may, and preferably will, also contain amounts of a good electrical conductor such as carbon or graphite to improve the electrical conductivity between the active material particles, the positive active material particles themselves generally being relatively poor conductors of electricity. The conductivity of the active material particles together with the conductivity of the binder itself will influence the amounts of conductors added to the electrode. The electrodes 20 and 20-A may also contain, if desired, small amounts of additional ingredients used for such purposes as maintaining uniform dispersion of active material particles during electrode construction, aiding the diffusion of electrolyte through the pores of the finally constructed electrodes, controlling viscosity during processing, controlling surface tension, controlling pot life, or for other reasons.

The negative electrodes 30 and 30-A may comprise spray or vapor deposits of metals or may comprise tiny particles of metals contained in and dispersed throughout a binder matrix. If the negative electrodes utilize a binder matrix, in general the same considerations regarding that matrix apply to the negative electrodes as do for the positive electrodes except that no electrical conductor may be needed to achieve desired electrical conductivity between the active material particles since the negative active materials are generally better conductors than are the positive materials. When the negative electrodes utilize a binder matrix, the binder system need not be the same as the one used in the positive electrodes, and even if it is, the proportions of binder, active material particles, and other ingredients in the negative electrodes may have a different optimum than the proportions of analagous ingredients in the positive electrode. The initial porosity of the negative electrodes may sometimes be less than that of the positive electrodes, since the negative electrode discharge reaction products are sometimes dissolved in the battery electrolyte. The porosity of the negative electrodes may be increased as the discharge rate desired in the battery is increased. The negative electrodes 30 and/or 30-A may also comprise thin sheets or foils of electrochemically negative material.

It is apparent that electrodes which comprise particles of active material would be unable or poorly suited to be produced as continuous strips. They should therefore be deposited upon a substrate which, in the case of this invention, is the continuous metal carrier strip having at least one nonreactive metal side.

Between each positive electrode 20 or 20-A and each negative electrode 30 or 30-A, is an electrolyte impregnated separator 40, the theoretical requirements of which are that it contain electrolyte as well as physically separate and prevent contact between the surrounding electrodes. A deposit of gelled electrolyte could by itself serve both functions if of proper thickness and/or consistency. The alternative construction uses a deposit of gelled or fluid electrolyte with a separator which is distinct from and in addition to the electrolyte, the separator providing added insurance against direct contact between the electrodes and acting as an absorbent material into which the electrolyte may be impregnated. Both alternative constructions may, however, be viewed as being forms of electrolyte impregnated separators. Where the separator is distinct from and in addition to the electrolyte, the separator may be made from a wide variety of materials including the fibrous and cellulosic materials which are conventional in battery construction as well as from woven or nonwoven fibrous materials such as polyester, nylon, polypropylene, polyethylene and glass.

Another essential of the multicell battery 5 is a liquid impervious layer comprising members 80 and 90 sealed around the electrodes and electrolyte impregnated separators as shown in FIG. 3. When a battery is in storage waiting to be placed into service, there is an opportunity for liquids from the electrolyte to escape from the battery, leaving the battery incapable of performing as desired when later placed into use. Also during discharge, the battery may produce liquid byproducts which are corrosive, poisonous, or otherwise harmful, and it is desirable to prevent these liquids from escaping from the battery. The liquid impervious layer provides means for preventing or minimizing the loss of these liquids.

The multicell battery 5 must also be provided with means for conducting electrical current between the outer positive electrode 20-A and the exterior of the liquid impervious layer and additional means for conducting electrical current between the outer negative electrode 30-A and the exterior of the liquid impervious layer. This additional requirement of the battery may be met by the liquid impervious layer members 80 and 90 themselves by constructing those members from a conductive material such as an electrochemically inert, electrically conductive plastic, and such a construction is shown in FIG. 3. As an alternative to the conductive plastic, metals which are either themselves electrochemically nonreactive (e.g., those used in the unimetals, bimetals, and trimetals of this invention) or are made so by appropriate conductive, nonreactive coatings may be used for the liquid impervious layer. Another alternative construction not illustrated in the drawings is to use a liquid impervious layer which is made from an electrically nonconductive material and then extend separate conductive means from the end electrodes 20-A and 30-A through or around the edge of the nonconductive, liquid impervious layer so that current may be withdrawn from the battery. It is to be understood that all of these alternative constructions are encompassed by the general statement that a liquid impervious layer is sealed around the electrodes and electrolyte impregnated separators, that electrically conductive means are connected to the outer positive electrode 20-A which extend to the exterior of the liquid impervious layer, and that additional electrically conductive means are connected to the outer negative electrode 30-A which extend to the exterior of the liquid impervious layer.

Two additional components, members 60 and 70, are shown in FIG. 3 and are illustrated because vapor may be used in the construction of the multicell battery produced by this invention. It should be understood, however, that the present invention does not require the use of members 60 and 70. Those members are metal foils or sheets, e.g., steel foil, which function both as vapor barriers to prevent evaporation of electrolyte from the battery and as current collecting means. Where a nonmetallic, nonconductive vapor barrier is used instead of steel foil, additional means must be provided to conduct current from the exterior of the liquid impervious layer (members 80 and 90) to the exterior of the vapor barrier. Where vapor barriers such as the members 60 and 70 shown in FIG. 3 are used with the battery, they may be laminated to the liquid impervious layers 80 and 90 if desired.

Liquid impervious sealing means must be provided around the perimeter of each electrolyte impregnated separator 40 to prevent electrolyte loss from the battery and to prevent the electrolyte of one cell from migrating to another cell around the perimeter of an intercell connector. Adhesive members 100 shown in FIG. 3 may serve as the needed liquid impervious sealing means. By being made from an electrically nonconductive adhesive, members 100 also serve an additional purpose, that of preventing undesired electrical connections between the metal intercell connector 50 and other electrically conductive members of the battery.

The multicell battery 5 of this invention may employ a wide variety of positive and negative electrode materials and a wide variety of electrochemical systems including both primary and secondary systems. Among the positive electrode materials are such commonly used inorganic metal oxides as manganese dioxide, lead dioxide, nickel oxyhydroxide, mercuric oxide and silver oxide, inorganic metal halides such as silver chloride and lead chloride, and organic materials capable of being reduced such as dinitrobenzene and azodicarbonamide compounds. Among the negative electrode materials are such commonly used metals as zinc, aluminum, magnesium, lead, cadmium, and iron. While the particular electrolyte to be used must be selected to be compatible with the positive and negative electrodes, this invention may with appropriate electrodes employ the electrolytes commonly used in the LeClanche system (ammonium chloride and/or zinc chloride), various alkaline electrolytes such as the hydroxides of potassium, sodium and/or lithium, acidic electrolytes such as sulfuric or phosphoric acid, and nonaqueous electrolytes.

Among the wide variety of electrochemical systems which may be used in the multicell battery 5 are those in which the positive electrodes comprise manganese dioxide, the negative electrodes comprise metals such as zinc, aluminum, or magnesium, and the electrolyte substantially comprises an acidic solution of inorganic salts. Another commonly known system useful in the battery 5 is the alkaline manganese system in which the positive electrodes comprise manganese dioxide, the negative electrodes comprise zinc, and the electrolyte substantially comprises a solution of potassium hydroxide. Other aqueous electrolyte systems, including those of nickel-zinc, silver-zinc, mercury-zinc, mercury-cadmium, and nickel-cadmium, may also be used. Systems employing organic positive electrodes and acidic electrolytes may also be used, including rechargeable systems using azodicarbonamide compound electrodes and LeClanche electrolyte.

The nonreactive metals required by this invention will be selected to be nonreactive in the electrochemical environment in which they are used, that is, so that they are nonreactive with the particular electrode materials and electrolyte used in the battery. Metals such as titanium and gold are nonreactive in nearly all commonly used electrochemical environments. Other metals such as tantalum are generally nonreactive in solutions of zinc chloride and ammonium chloride or acidic electrolytes, while such metals as nickel and steel are generally nonreactive in alkaline systems.

Illustrative of steel of the many constructions which may be built using the principles of this invention are the following examples:

EXAMPLE 1

Using the construction shown in FIGS. 1, 3, and 4, a multicell battery may be built using a unimetal carrier strip of titanium or tantalum and the LeClanche electrochemical system (manganese dioxide positive electrode, zinc negative electrode, and electrolyte of a zinc chloride and/or ammonium chloride solution).

EXAMPLE 2

Using the construction shown in FIGS. 1, 3 and 4, a multicell battery may be built using a unimetal carrier strip of titanium and the lead-acid system (lead dioxide positive electrode, lead negative electrode, and sulfuric acid electrolyte).

EXAMPLE 3

Using the construction shown in FIGS. 1, 3 and 4, a multicell battery may be built using a unimetal carrier strip of nickel and the nickel-cadmium system (nickel oxyhydroxide positive electrode, cadmium negative electrode, and potassium hydroxide electrolyte).

EXAMPLE 4

Using the processing principles of FIG. 1 and a trimetal strip such as shown in FIG. 6, a multicell battery may be built using a nickel-steel-tin carrier strip and the alkaline-manganese system (manganese dioxide positive electrode, zinc amalgam negative electrode, and electrolyte of potassium hydroxide plus zinc oxide).

EXAMPLE 5

Using the processing principles of FIG. 1 and a bimetal strip such as shown in FIG. 5, a multicell battery may be built using a nickel-tin carrier strip and the silver-zinc system (silver oxide positive electrode, zinc amalgam negative electrode, and electrolyte of potassium hydroxide plus zinc oxide).

EXAMPLE 6

Using the processing principles of FIG. 1 and a trimetal strip such as shown in FIG. 6, a multicell battery may be built using a gold-steel-tin carrier strip and the mercury-zinc system (mercuric oxide positive electrode, zinc amalgam negative electrode, and electrolyte of potassium hydroxide plus zinc oxide)

EXAMPLE 7

Using a bimetal carrier strip such as shown in FIG. 7 and applying positive electrodes in the manner illustrated in FIG. 1, a multicell battery may be built using a titanium-zinc carrier strip and the LeClanche system.

EXAMPLE 8

Using a trimetal carrier strip having outer layers of nickel and zinc and an inner layer of tin, a multicell battery may be built using the nickel-zinc system (nickel oxyhydroxide positive electrode, zinc negative electrode, and potassium hydroxide electrolyte).

We claim:

1. The method of constructing structurally electrically unconnected multicell batteries containing electrodes and electrolyte, the method comprising the steps of:
   a. constructing duplex electrodes which are structurally and electrically connected together along a continuous metal carrier strip having two metal sides which are electrochemically nonreactive with respect to the electrodes in the presence of the electrolyte, each duplex electrode comprising a segment of the strip, a positive electrode on one side of that segment, and a negative electrode on the other side of that segment, the method of constructing the duplex electrodes comprising the steps of:
      i. placing intermittent deposits of a positive electrode along the carrier strip, and
      ii. placing intermittent deposits of a negative electrode along the carrier strip, each deposit of negative electrode being on the other side of the strip from and substantially opposite a deposit of positive electrode; then,
   b. assembling multicell batteries which are structurally and electrically connected together by at least one of the carrier strips having positive and negative electrodes deposited thereon, the method of assembling the multicell battery comprising the steps of
      i. placing at least one of the carrier strips with the positive and negative electrodes deposited thereon between outer positive electrodes and outer negative electrodes so that each duplex electrode is between an outer positive electrode and an outer negative electrode,
      ii. placing an electrolyte impregnated separator between each positive and negative electrode,
      iii. sealing around the perimeter of each electrolyte impregnated separator to produce a liquid impervious seal,
      iv. sealing a liquid impervious layer around the electrodes and electrolyte impregnated separators, and,
      v. connecting to each outer positive electrode electrically conductive means which extend to the exterior of the liquid impervious layer and connecting to each outer negative electrode additional electrically conductive means which extend to the exterior of the liquid impervious layer; and then,
   c. cutting each carrier strip between duplex electrodes to obtain structurally and electrically unconnected multicell batteries.

2. The method of constructing a multicell battery containing electrodes and electrolyte, the method comprising the steps of:
   a. constructing duplex electrodes which are structurally and electrically connected together along a continuous metal carrier strip having two metal sides which are electrochemically nonreactive with respect to the electrodes in the presence of the electrolyte, each duplex electrode comprising a segment of the strip, a positive electrode on one side of that segment, and a negative electrode on the other side of that segment, the method of constructing the duplex electrodes comprising
      i. placing intermittent deposits of a positive electrode along the carrier strip, and
      ii. placing intermittent deposits of a negative electrode along the carrier strip, each deposit of negative electrode being on the other side of the strip from and substantially opposite a deposit of a positive electrode; then,
   b. cutting each carrier strip between duplex electrodes to obtain structurally and electrically unconnected duplex electrodes; and then,
   c. assembling a multicell battery by
      i. placing at least one of the structurally and electrically unconnected duplex electrodes between an outer positive electrode and an outer negative electrode, ii. placing an electrolyte impregnated separator between each positive and negative electrode, iii. sealing around the perimeter of each electrolyte impregnated separator to produce a liquid impervious seal, iv. sealing a liquid impervious layer around the electrodes and electrolyte impregnated separators, and v. connecting to the outer positive electrode electrically conductive means which extend to the exterior of the liquid impervious layer and connecting the the outer negative electrode additional electrically conductive means which extend to the exterior of the liquid impervious layer.

3. The method of constructing structurally and electrically unconnected multicell batteries containing positive and negative electrodes and electrolyte, the method comprising the steps of:

a. constructing duplex electrodes which are structurally and electrically connected together along a continuous metal carrier strip having one metal side which is electrochemically nonreactive with respect to positive and negative electrodes in the presence of the electrolyte and one metal side which is electrochemically reactive wit respect to the positive electrode in the presence of the electrolyte, each duplex electrode comprising a segment of the strip and a positive electrode on the nonreactive side of that segment, the method of constructing the duplex electrodes comprising the step of placing intermittent deposits of a positive electrode along the nonreactive metal side of the carrier strip; then, b. assembling multicell batteries which are structurally and electrically connected together by at least one of the carrier strips having positive electrodes deposited thereon, the method of constructing the multicell battery comprising the steps of i. placing at least one of the carrier strips with the positive electrodes deposited thereon between outer positive electrodes and outer negative electrodes so that each duplex electrode is between an outer positive electrode and an outer negative electrode, ii. placing electrolyte impregnated separators between the outer electrodes so that an electrolyte impregnated separator is on each side of each duplex electrode, iii. sealing around the perimeter of each electrolyte impregnated separator to produce a liquid impervious seal, iv. sealing a liquid impervious layer around the electrodes and electrolyte impregnated separators, and v. connecting to each outer positive electrode electrically conductive means which extend to the exterior of the liquid impervious layer and connecting to each outer negative electrode additional electrically conductive means which extend to the exterior of the liquid impervious layer; and then, c. cutting each carrier strip between duplex electrodes to obtain structurally and electrically unconnected multicell batteries.

4. The method of constructing a multicell battery containing positive and negative electrodes and electrolyte, the method comprising the steps of:

a. constructing duplex electrodes which are structurally and electrically connected together along a continuous metal carrier strip having one metal side which is electrochemically nonreactive with respect to positive and negative electrodes in the presence of the electrolyte and one metal side which is electrochemically reactive with respect to the positive electrode in the presence of the electrolyte, each duplex electrode comprising a segment of the strip and a positive electrode on the nonreactive metal side of that segment, the method of constructing the duplex electrodes comprising the step of placing intermittent deposits of a positive electrode along the nonreactive metal side of the carrier strip; then, b. cutting each carrier strip between duplex electrodes to obtain structurally and electrically unconnected duplex electrodes; and then, c. assembling a multicell battery by i. placing at least one of the structurally and electrically unconnected duplex electrodes between an outer positive electrode and an outer negative electrode, ii. placing electrolyte impregnated separators between the outer electrodes so that an electrolyte impregnated separator is on each side of each duplex electrode, iii. sealing around the perimeter of each electrolyte impregnated separator to produce a liquid impervious seal, iv. sealing a liquid impervious layer around the electrodes and electrolyte impregnated separators, and v. connecting to the outer positive electrode electrically conductive means which extend to the exterior of the liquid impervious layer and connecting to the outer negative electrode additional electrically conductive means which extend to the exterior of the liquid impervious layer.

5. The method of constructing multicell batteries containing electrodes and electrolyte using a continuous metal carrier strip having two metal sides which are electrochemically nonreactive with respect to the electrodes in the presence of the electrolyte, the carrier strip having a plurality of intermittent deposits of positive electrodes thereon and a plurality of intermittent deposits of negative electrodes thereon, each deposit of negative electrode being on the other side of the strip from and substantially opposite a deposit of positive electrode, the method comprising the steps of:

a. placing the carrier strip between outer positive and outer negative electrodes so that a positive electrode on the carrier strip faces an outer negative electrode and so that a negative electrode on the carrier strip faces an outer positive electrode;

b. placing an electrolyte impregnated separator between each electrode deposit on the carrier strip and the outer electrode facing it;

c. sealing liquid impervious layers around the electrodes deposited on the carrier strip so that each electrode on the carrier strip is surrounded by a liquid impervious seal; and, d. connecting to each outer positive electrode electrically conductive means which extend to the exterior of the liquid impervious layers and connecting to each other negative electrode additional electrically conductive means which extend to the exterior of the liquid impervious layers.

6. The method of claim 5 in which the carrier strip is subsequently cut between the intermittent deposits along the strip to obtain structurally and electrically unconnected multicell batteries.

7. The method of construction multicell batteries containing electrodes and electrolyte using a continuous metal carrier strip having two metal sides which area electrochemically nonreactive with respect to the electrodes in the presence of the electrolyte, the carrier strip having a plurality of intermittent deposits of positive electrodes thereon and a plurality of intermittent deposits of negative electrode thereon, each deposit of negative electrode being on the other side of the strip from and substantially opposite a deposit of positive electrode, the method comprising the steps of:

a. cutting a segment from the carrier strip which segment contains at least one pair of opposed positive and negative electrodes, that pair of opposed positive and negative electrodes and the segment of strip between them comprising a duplex electrode;
   b. assembling a multicell battery by placing the duplex electrode between an outer positive electrode and an outer negative electrode so that the positive electrode of the duplex electrode faces the outer negative electrode and so that the negative electrode of the duplex electrode faces the outer positive electrode;
   c. placing an electrolyte impregnated separator between each of the electrodes of the duplex electrode and the outer electrodes which they face;
   d. sealing liquid impervious layers around the duplex and outer electrodes so that they are surrounded by a liquid impervious seal; and,
   e. connecting to the outer positive electrode electrically conductive means which extend to the exterior of the liquid impervious layers and connecting to the outer negative electrode electrically conductive means which extend to the exterior of the liquid impervious layers.

8. The method of constructing multicell batteries containing positive and negative electrodes and electrolyte using a continuous metal carrier strip having one metal side which is electrochemically nonreactive with respect to positive and negative electrodes in the presence of the electrolyte and one metal side which is electrochemically reactive with respect to the positive electrodes in the presence of the electrolyte, the carrier strip having a plurality of intermittent deposits of positive electrodes along the nonreactive metal side thereof, the method comprising the steps of:

a. placing the carrier strip between outer positive and outer negative electrodes so that the positive electrodes on the strip face the outer negative electrodes;
   b. placing an electrolyte impregnated separator between each outer electrode and the strip;
   c. sealing liquid impervious layers around the outer electrodes and the strip so that they are surrounded by a liquid impervious seal; and,
   d. connecting to each outer positive electrode electrically conductive means which extend to the exterior of the liquid impervious layers and connecting to each outer negative electrode additional electrically conductive means which extend to the exterior of the liquid impervious layers.

9. The method of claim 8 in which the carrier strip is subsequently cut between the intermittent deposits along the strip to obtain structurally and electrically unconnected multicell batteries.

10. The method of constructing multicell batteries containing positive and negative electrodes and electrolyte using a continuous metal carrier strip having one metal side which is electrochemically reactive with respect to the positive electrodes in the presence of the electrolyte, the carrier strip having a plurality of intermittent deposits of positive electrodes along the nonreactive metal side thereof, the method comprising the steps of:

a. cutting a segment from the carrier strip which segment contains at least one positive electrode, that segment and the positive electrode deposited thereon comprising a duplex electrode;
   b. assembling a multicell battery by placing the duplex electrode between an outer positive electrode and an outer negative electrode so that the positive electrode of the duplex electrode faces the outer negative electrode;
   c. placing an electrolyte impregnated separator between each outer electrode and the duplex electrode;
   d. sealing liquid impervious layers around the outer electrodes and the duplex electrode so that they are surrounded by a liquid impervious seal; and,
   e. connecting to the outer positive electrode electrically conductive means which extend to the exterior of the liquid impervious layers and connecting to the outer negative electrode electrically conductive means which extend to the exterior of the liquid impervious layers.

* * * * *